Feb. 19, 1957  R. J. CASSIDY  2,781,830
BURNER SAFETY CONTROL SYSTEM WITH PURGING
Original Filed Nov. 12, 1949

Inventor
Robert J. Cassidy
R. E. Fowler
Attorneys

United States Patent Office 2,781,830
Patented Feb. 19, 1957

2,781,830

BURNER SAFETY CONTROL SYSTEM WITH PURGING

Robert J. Cassidy, Mansfield, Ohio, assignor to General Motors Corporation, Detroit, Mich., a corporation of Delaware Original application November 12, 1949, Serial No. 126,817, now Patent No. 2,672,188, dated March 16, 1954. Divided and this application February 25, 1954, Serial No. 412,543

4 Claims. (Cl. 158—28)

The present invention relates generally to control systems and more particularly to a safety control system for fluid fuel burners such as are operated intermittently in accordance with heating requirements, and is a division of S. N. 126,817, filed November 12, 1949 issued March 16, 1954, as Patent No. 2,672,188.

The principal object of the invention is to provide a simple and effective control system for fluid fuel burners that incorporates a purging cycle after cessation of fluid fuel flow.

Another object of this invention is to provide a control system for a heating source in which a thermally responsive resistor is employed to continue operation of the fan which supplies combustion air for a predetermined time after stopping of the fluid fuel feed to purge the heater of combustible matter and obnoxious fumes.

As will be hereinafter described, the basic control system includes a thermally responsive resistor as a temperature-sensitive element subject to heat of combustion gases and a thermally responsive self-heating resistor as a timing and voltage regulating element with these elements so associated in the system as to jointly control a relay for the power supply to the burner.

Figure 1:
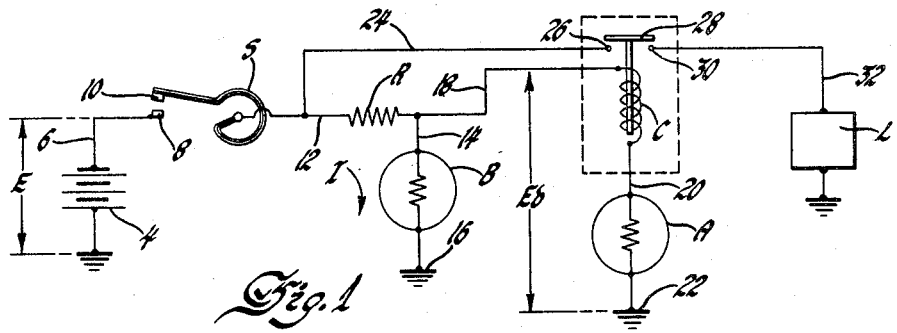
Fig. 1 is a circuit diagram of the basic control system.

Referring first to the showing in Fig. 1, the reference characters A and B have been applied to thermally responsive resistor units which will be hereinafter referred to as a stack resistor and a timing resistor, respectively. Each of these units, as employed in the present system, is a resistance unit having a relatively high negative temperature coefficient wherein the resistance to current flow through the resistance decreases materially as the temperature thereof rises. It will be understood that these resistor units may be of any suitable type having resistance material with the desired negative resistance temperature characteristic. Such materials are well known in the art and may consist, for instance, of various semi-conducting materials including oxides of copper, chrome, iron or manganese and combinations of these oxides which have been heretofore employed for negative resistance-temperature coefficient resistor units.

In the present system the stack resistor A is located in the exhaust stack of the fluid fuel burner so as to be primarily responsive to the temperature of the combustion or exhaust gases and is preferably so designed as to have a relatively low thermal inertia to respond readily to variations in gas temperature. The timing resistor B is of the self-heating type with its temperature primarily responsive to current flow through the resistance material and such temperature may be controlled by controlling the dissipation of heat generated within the resistor due to the $I^2R$ loss.

In the wiring diagram of Fig. 1 a source of current such as the grounded battery 4 is shown as connected by conductor 6 to the fixed contact 8 of a control switch, such as a conventional thermostat S, having the movable contact 10 connected to one side of a fixed dropping resistance R by conductor 12. The other side of resistance R is connected by conductor 14 to the timing resistor B which is grounded at 16. This side of the resistance R is also connected by a conductor 18 to one end of a control relay coil C having its other end connected by conductor 20 to the stack resistor A which is grounded at 22. It will be noted that the stack resistor A is in series with the relay coil C and that the timing resistor B is in shunt with the resistor A and coil C. A conductor 24 connects conductor 12 to a contact 26 of a relay switch having a contact arm 28 adapted to move upon proper energization of control relay coil C to engage both contact 26 and a contact 30 which is connected by conductor 32 to the grounded load L which may consist of a fuel pump or valve, ignition coil, fuel air fan or such other elements as may be used to operate the burner and provide combustion when there is a demand for heat by the thermostat S.

Before describing the operation of the complete circuit it is believed it would be desirable to explain the functions of the stack resistor A and timing resistor B. Considering first the stack resistor A it will be seen that since resistor A is in series with the relay coil C, the voltage indicated at $Eb$ in Fig. 1 between conductor 18 and ground will be shared between these elements. The electrical characteristics of the stack resistor A and relay coil C are so chosen that at a given steady value of voltage $Eb$, when stack resistor A is cold and of high resistance the greater part of this voltage appears across the resistor A so that relay coil C is not energized, but as the stack resistor A is heated to reduce its resistance, a greater part of the voltage $Eb$ appears across and energizes the relay coil C. If, however, the voltage $Eb$ should assume values considerably higher than normal, the relay coil C will be energized even though the stack resistor A is cold and it will therefore be seen that the relay coil C can be controlled by the ambient temperature of resistor A and/or by the value of voltage $Eb$.

Figure 2:
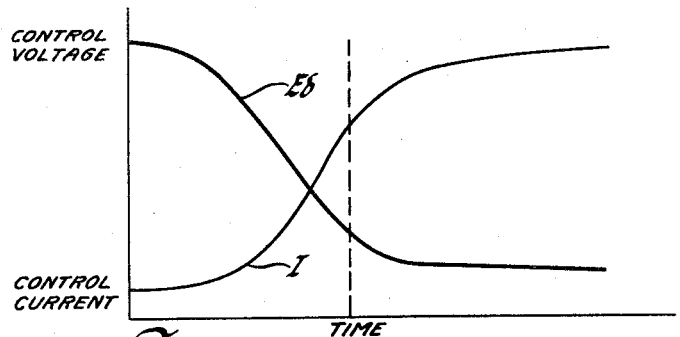
Fig. 2 is a graph showing certain characteristics of one of the thermally responsive resistors.

The timing resistor B and fixed resistance R are adapted to control and regulate the voltage $Eb$. The timing resistor B is designed and operated so that self-heating from current I causes its resistance to vary with time until a steady-state condition obtains where the current rise is limited by resistance R as shown by the graph in Fig. 2. In the final steady-state condition voltage $Eb$ is substantially independent of the source voltage indicated at E. in Fig. 1 and load current variations due to the self-regulating action of the timing resistor B. As will be noted hereinafter the initial falling-off portion of the $Eb$ voltage-time characteristic is employed in the present control system so that the relay coil C will be deenergized at a given time after the closure of thermostat S if normal combustion fails to occur.

Upon closure of the thermostat S current will flow from the battery 4 through the fixed resistance R and then through conductor 14 and timing resistor B to ground 16, and through conductor 18, relay coil C, conductor 20 and stack resistor A to ground 22. If the burner has not been in operation for some time so that both the resistors are cool, the relatively large value of the voltage $Eb$ appearing across the timing resistor B, as noted above, will immediately energize the control relay coil C to thereby close the relay switch and supply current through conductors 24 and 32 to the load L to operate the burner. If proper combustion occurs, the stack resistor A will be rapidly heated by the exhaust gases to thereby reduce its resistance to a very low value and throw a large portion of voltage $Eb$ across the magnet coil C. Meanwhile the timing resistor B is heating due to its own $I^2R$ loss to thereby decrease its resistance and cause voltage $Eb$ to fall toward a predetermined level such that if the stack resistor A is hot, the relay coil C will remain energized but if the stack resistor A is not heated the relay coil C will not receive sufficient voltage to retain the relay switch in closed position. Therefore if the burner fails to ignite or provide proper combustion when started, or if during operation combustion should fail or become so poor as to reduce the temperature of the stack resistor A below some predetermined point, the relay switch will open to discontinue burner operation.

To provide the foregoing operation it will be apparent that the electrical characteristics of the timing resistor B and fixed resistance R should be so chosen as to allow sufficient time to elapse before reducing voltage $Eb$ to such an extent as to drop out the relay switch to accommodate normal ignition of the fuel and heating of the stack resistor A by the burner exhaust gases. It is preferable to employ a control relay having cut-in and cut-out voltage points close together with a relay coil that requires a minimum of current to reliably operate the relay switch to avoid any appreciable self-heating of the stack resistor A.

If burner operation has been discontinued as described above as a result of initial or subsequent failure of combustion it will be apparent that the relay coil C cannot be sufficiently energized to close the relay switch and resume burner operation as long as the thermostat S is closed since the timing resistor B remains heated to maintain voltage $Eb$ at a low value in the previously mentioned steady-state condition. Thereafter the operation of the burner can only be initiated or attempted if the thermostat S is opened for a short time to permit cooling of the timing resistor B.

Various safety factors of the present control system should be noted in addition to the "normal" safety operation described heretofore. If, for instance, the stack resistor A should fail by open-circuiting when subjected to high temperature operation, the relay coil C would be deenergized, and either open-circuiting or short-circuiting of the relay coil C would result in opening of the relay switch. If an enclosed type of mounting is employed for the timing resistor B and it should fail by a short-circuit, the voltage $Eb$ would be reduced to zero to deenergize relay coil C, and the resistor R may be so constructed as to pass short-circuit current without damage to itself or other parts of the system.

With reference to the effects of ambient temperature extremes on the operating efficiency of the present control system it will be seen that very low temperatures produce a higher resistance in the timing resistor B and lengthen the timing thereof to thereby provide more time for the burner to heat up the stack resistor A. Since the stack resistor A is responsive to the relatively high temperature of the exhaust gases it can readily be designed so that ambient temperature changes have no material effect and the relay coil C can of course be temperature compensated in any known manner, if desired.

Figure 3:
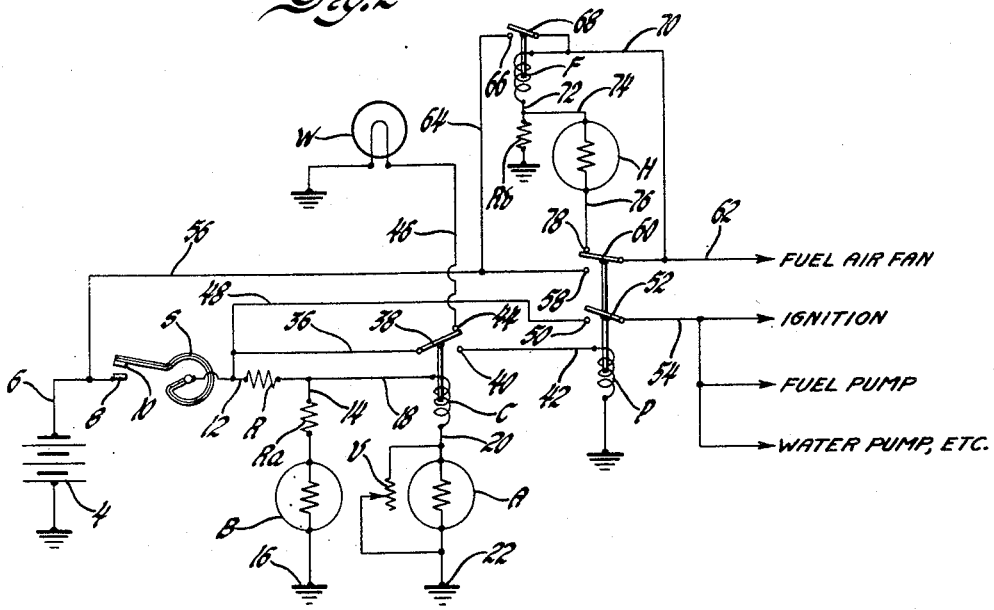
Fig. 3 is a circuit diagram of the complete control system embodying my invention.

Fig. 3 shows the complete control system for use where the electrical loads are heavy and to provide continued operation of the fan which supplies combustion air to the burner for a predetermined time after the fuel feed has been stopped to purge the heater of combustible matter and obnoxious fumes.

In the system of Fig. 3, the several parts which correspond to similar parts in Fig. 1 have been designated by the same reference characters. It will be noted that what might be termed the basic control system of Fig. 1 wherein the stack resistor A, timing resistor B, and control relay coil C are so related and associated in the circuit as to function in the manner heretofore described, is incorporated in the system of Fig. 3 without change except for the addition of the resistance Ra in conductor 14 to reduce the voltage across the timing resistor B and the addition of the variable resistance V in conductor 20 to provide for adjustment of the voltage across the stack resistor A. It will also be noted, however, that the control relay coil C does not operate a switch in the load circuit as in Fig. 1 but controls the energization of a power relay as will be hereinafter described.

As shown in Fig. 3 the conductor 12 is connected by a conductor 36 to the contact arm 38 which is adapted to be moved upon energization of control relay coil C into engagement with a contact 40 connected by conductor 42 to the grounded power relay coil P. When the relay coil C is not energized, the contact arm 38 is adapted to engage a contact 44 connected by conductor 46 to a grounded warning light or other signal W. The conductor 12 is also connected by a conductor 48 to a contact 50 adapted to be engaged by a movable contact arm 52 when the power relay coil P is energized to supply current through a conductor 54 to operate such elements as the fuel pump and high tension ignition system for the burner and any desired elements of the heating system associated with the burner such as a water circulating pump, warm air blower, etc.

To control the operation of the fuel air fan which is adapted to supply air to the burner to be mixed with the fluid fuel, the battery 4 or conductor 6 is connected by a conductor 56 to a contact 58 adapted to be engaged by a contact arm 60 movable with contact arm 52 when the power relay coil P is energized with the arm 60 connected by conductor 62 to the fuel air fan or motor operating the same. The operation of the fuel air fan is also controlled in the manner to be hereinafter described by a fan relay coil F, a resistance $Rb$ and a thermally responsive resistor H. A conductor 64 connects conductor 56 to a contact 66 adapted to be engaged by a movable contact arm 68 when the fan relay coil F is energized. The contact arm 68 is connected to a conductor 70 which connects conductor 62 to one end of the relay coil F with the other end of this coil connected by a conductor 72 to the grounded resistance $Rb$ and by a conductor 74 to a thermally responsive resistor H which is connected by conductor 76 to a contact 78 adapted to be engaged by the movable contact arm 60 when the power relay coil P is not energized. The thermally responsive resistor H is generally similar to the previously described timing resistor B in that it consists of a resistance unit having a negative temperature coefficient and is of the self-heating type in which the resistance material is primarily heated by current flow therethrough to decrease its resistance.

In the system of Fig. 3 it will be apparent that the safety control operation provided by the basic control system which includes the stack resistor A, timing resistor B and control relay coil C is the same as that of Fig. 1 with the previously noted exception that the control relay coil C does not directly operate a switch in the load circuit but controls the energization of the power relay coil P to operate switch arms 52 and 60 to supply current to the burner, etc. With reference thereto it should be noted that a warning signal W has been provided in Fig. 3 which will be energized upon engagement of the switch arm 38 with contact 44 to call attention to the failure of proper combustion whenever the thermostat S is closed and calling for heat but the control relay coil C has been deenergized in the manner heretofore described upon absence of proper combustion.

When the thermostat S closes upon a demand for heat, the initial operation of the fuel air fan is controlled by the energization of the power relay coil P to move contact arm 60 into engagement with contact 58 to thereby connect conductor 56 to conductor 62. As soon as contact arm 60 engages contact 58 current passes through conductor 70, fan relay coil F and grounded resistance $Rb$ and energizes the coil F to actuate contact arm 68 into engagement with contact 66. The closure of this switch completes a holding circuit for the fan relay coil F from conductor 56 through conductor 64 and the switch, and also connects conductor 56 to conductor 62 through conductors 64 and 70 to thereby connect the source of current directly to the fuel air fan and bypass both the thermostat S and the power relay switch contact 58 and arm 60.

Whenever either the thermostat S opens or there is a failure of proper combustion, the power relay coil P will be deenergized and the contact arms 52 and 60 will move out of engagement with the respective contacts 50 and 58. The current supply to operate the fuel pump and ignition for the burner will be thereby interrupted but current supply to operate the fuel air fan will be maintained for predetermined time thereafter by the bypass connection around thermostat S and the power relay contact arm 60 and contact 58 through the fan relay switch, as described above. As the contact arm 60 moves away from contact 58 it engages the contact 78 to complete a shunt circuit through conductor 76, resistor H and conductor 74 and shunt the resistor H across the fan relay coil F. The resistor H is then heated by its resistance to current flow to thereby decrease its resistance until it has caused the voltage across the relay coil F to reach such a low value that this coil is deenergized or insufficiently energized to retain the contact arm 68 in engagement with contact 66 and the circuit will then be opened by this fan relay switch to disconnect the fuel air fan, fan relay coil F and resistor H from the source of current.

Although the preferred basic safety control system and one elaboration thereof have been shown and described herein, it should be understood that the present invention is not limited specifically thereto since modifications in the basic system and further elaborations thereof will occur to those skilled in the art and are contemplated as within the scope of the present invention as defined in the claims appended hereto.

I claim:

1. In a control system for fuel burners, a grounded source of power, a power relay connected thereto to control burner operation including a power switch to control operation of a fan to supply air for combustion, a bypass circuit connected to said source and around said power switch including a normally open fan relay switch, an electrically operable magnetic field creating means connected to said bypass circuit on the side of the power switch controlling the fan remote from the source of power and to ground to actuate said fan relay switch upon closure of said power switch, and means connected to said magnetic field creating means to gradually progressively decrease the current flow through the magnetic field creating means with the opening of the power switch to a point where the magnetic field creating means releases the fan relay switch to delay opening of said fan relay switch for a predetermined time after opening of said power switch.

2. The control system set forth in claim 1 in which said means to delay opening of said fan relay switch includes a resistor connected to said field creating means whose resistance varies with its temperature in response to self-heating by internal resistance to current flow, and additional switching means connected to said resistor to connect said resistor in shunt with said field creating means upon opening of said power switch.

3. In a control system for fuel burners, a grounded source of power, a power relay connected thereto to control burner operation including a power switch to control operation of a fan to supply air for combustion and a power relay coil operatively associated with and arranged to close said switch when energized, a bypass circuit connected to said source and around said power switch including a normally open fan relay switch with a fan relay coil operatively associated therewith to close said fan relay switch when energized, a resistance, said fan relay coil connected to said bypass circuit on the side of the power switch controlling the fan remote from the source of power and through said resistance to ground and being arranged to be energized by closure of said power switch, and a thermally responsive resistor connected to said relay coil, and additional switching means connected to said resistor and bypass circuit to connect said resistor in shunt with said fan relay coil by operation of said power switch when said power relay coil is deenergized, said resistor having a negative temperature coefficient and responsive to self-heating by internal resistance to lower its resistance and reduce the voltage across said fan relay coil to deenergize said coil and open said fan relay switch within a predetermined time after deenergization of said power relay coil.

4. In a control system for fuel burners, a grounded current source, a power relay including a first power switch connected thereto to connect the current source to a fuel pump and ignition operating means for the burner, a second power switch connected to said source to connect the current source to fan operating means to supply combustion air to the burner, and a power relay coil to close both said switches when energized, a thermostat connected between the current source and said power relay coil to energize the latter upon demand for heat, a normally open bypass circuit around said second power switch and thermostat to connect the current source to the fan operating means independently of said thermostat, circuit closing means in said bypass circuit to complete said bypass circuit, electrical operating means for the circuit closing means connected to the side of said second power switch remote from the source of power and to ground and energized upon closure of the second power switch, and means connected to said operating means for the circuit closing means to gradually progressively decrease the current flow through said operating means with the opening of the second power switch to a point of release of the circuit closing means to delay the opening of said circuit closing means for a predetermined time after opening of said thermostat to deenergize the power relay coil and open said first and second switches.

References Cited in the file of this patent

UNITED STATES PATENTS

| | | |
|---|---|---|
| 1,516,646 | Roseby | Nov. 25, 1924 |
| 2,304,613 | Vroom | Dec. 8, 1942 |
| 2,440,700 | Roesche | May 4, 1948 |
| 2,616,490 | Wilson | Nov. 4, 1952 |
| 2,672,188 | Cassidy | Mar. 16, 1954 |